United States Patent [19]

Venables, III et al.

[11] 4,381,592
[45] May 3, 1983

[54] METHOD OF PRODUCING HELICALLY WOUND SPINE FIN HEAT EXCHANGER

[76] Inventors: Herbert J. Venables, III; Herbert J. Venables, IV, both of Shaker Blvd., Hunting Valley Village, Chagrin Valley Post Office, Ohio 44022

[21] Appl. No.: 251,951

[22] Filed: Apr. 7, 1981

Related U.S. Application Data

[62] Division of Ser. No. 16,799, Mar. 2, 1979, abandoned.

[51] Int. Cl.³ ............................................. B23P 15/26
[52] U.S. Cl. .......................... 29/157.3 AH; 29/33 G; 29/727; 165/184
[58] Field of Search ................ 29/157.3 C, 157.3 AH, 29/157.3 B, 726, 727, 33 G; 113/118 C; 165/146, 183, 184, 172, 173

[56] References Cited

U.S. PATENT DOCUMENTS

| | | | |
|---|---|---|---|
| 1,524,520 | 1/1925 | Junkers | 165/146 |
| 1,909,005 | 5/1933 | Paugh | 165/184 |
| 2,004,388 | 6/1935 | DeWald | 29/727 |
| 2,087,723 | 7/1937 | McCord | 29/157.3 AH |
| 2,234,423 | 3/1941 | Wittmann | 165/184 |
| 2,396,795 | 3/1946 | Lea | 29/157.3 AH |
| 2,440,803 | 5/1948 | Lea | 29/157.3 AH |
| 2,796,794 | 6/1957 | Bruegger | 29/33 G |
| 2,799,389 | 7/1957 | Stikeleather | 72/137 |
| 2,868,515 | 1/1959 | Garland | 165/150 |
| 3,005,253 | 10/1961 | Venables | 29/157.3 AH |
| 3,134,166 | 5/1964 | Venables | 29/157.3 AH |
| 3,160,129 | 12/1964 | Venables | 29/157.3 AH |
| 3,216,232 | 11/1965 | Stikeleather | 29/157.3 AH |
| 3,319,446 | 5/1967 | Stikeleather | 29/157.3 AH |
| 3,688,375 | 9/1972 | Venables | 29/157.3 AH |
| 3,877,517 | 4/1975 | Pasternak | 165/146 |
| 4,161,214 | 7/1979 | Wendal | 165/184 |

Primary Examiner—Daniel C. Crane
Attorney, Agent, or Firm—Pearne, Gordon, Sessions, McCoy, Granger & Tilberry

[57] ABSTRACT

A spine fin heat exchanger is disclosed in which the density of the spine fins is greater along the portions of the passes within the pattern of high flow of air or the like across the heat exchanger. Those portions of the tubing at the bends and outside such pattern are formed with a lower spine fin density. Such lower density outside the patterns and at the bends does not materially reduce the overall heat exchange capacity of the heat exchanger, and results in a heat exchanger where less material and time are required to form the heat exchanger without any significant loss in its capacity. The heat exchanger is preferably formed by changing the rate of feed of the tube as it feeds through the winding head to increase the amount of stretch of the spine fin strip along the zones of low density compared to the amount of stretch in the strip along the zone of high density. Consequently, the same amount of material is required for each wrap along both zones.

6 Claims, 2 Drawing Figures

METHOD OF PRODUCING HELICALLY WOUND SPINE FIN HEAT EXCHANGER

This is a division of application Ser. No. 16,799, filed Mar. 2, 1979, now abandoned.

BACKGROUND OF THE INVENTION

This invention relates generally to heat exchanger systems and, more particularly, to a novel and improved spine fin tube heat exchanger and to a novel and improved method and apparatus for producing such heat exchangers.

PRIOR ART

It is known to combine heat exchangers with fans or the like to move a stream of fluid such as air over the heat exchanger in order to cause heat to be transferred between the fluid and the heat exchanger. Such systems are often used, for example, in heat pumps in air conditioning units.

It is further known to provide such heat exchangers with tubes helically wrapped with spine fins, as disclosed in my U.S. Pat. Nos. 3,005,253; 3,134,166; 3,160,129; and 3,688,375, and such Letters Patent are incorporated herein by reference.

Such spine fin tube heat exchangers are formed by wrapping a substantially straight tube with one or more strips of helically arranged spine fins wherein the helix angle of the strips and the axial spacing of the spine fine are uniform. Such spine fins greatly increase the heat exchange capacity for a given length of tube. After wrapping, such tube is bent back and forth to form multiple pass heat exchangers, which are usually installed in systems with a fan or the like that forces fluid across the passes.

In the past, such heat exchanger tubes have been wrapped with a uniform helix angle even though the spine fins at the bends are damaged during the bending operation and therefore do not contribute to the transfer of heat as efficiently as the undamaged portions along the length of the passes. Further, such uniformly wrapped passes do not uniformly contribute to the heat exchange capacity in most instances, since the fans or the like do not move uniform amounts of fluid across the entire length of such passes.

SUMMARY OF THE INVENTION

The present invention is directed to an improved spine fin heat exchanger and to a method and apparatus for producing such heat exchanger. The tubing of such heat exchanger is helically wound with spine fins which are arranged to have a smaller helix angle and smaller spacing along the passes of the heat exchanger where the greatest amounts of fluid pass and are arranged to have a greater helix angle and larger spacing along the portions of the tube at the bends and along the portions of the tube over which lesser amounts of fluid pass. Consequently, a heat exchanger for a given capacity requires less material and time to produce.

In accordance with the present invention, the tubing is wrapped with the helically wound spine fins while the tube is substantially straight. In order to provide the portions with a greater helix angle, the apparatus for manufacturing of the wrapped tubing is arranged to vary the relative speed between the axial feeding of the tubing and the speed of rotation of the wrapping head to produce first spaced zones with a relatively small helix angle and small fin spacing and intermediate second zones spaced along the length of the tubing with the greater helix angles and greater fin spacing. Preferably, the variation in helix angle is accomplished by changing the rate at which the tubing is fed axially into the winding head and the machine is programmed to produce the zones of greater helix angle at appropriate locations along the length of the tube so that when the tube is bent into the finished heat exchanger, such zones extend along the bends in the tube and along the portions of the tube over which lesser amounts of fluid pass.

DETAILED DESCRIPTION OF THE DRAWINGS

Figure 1:
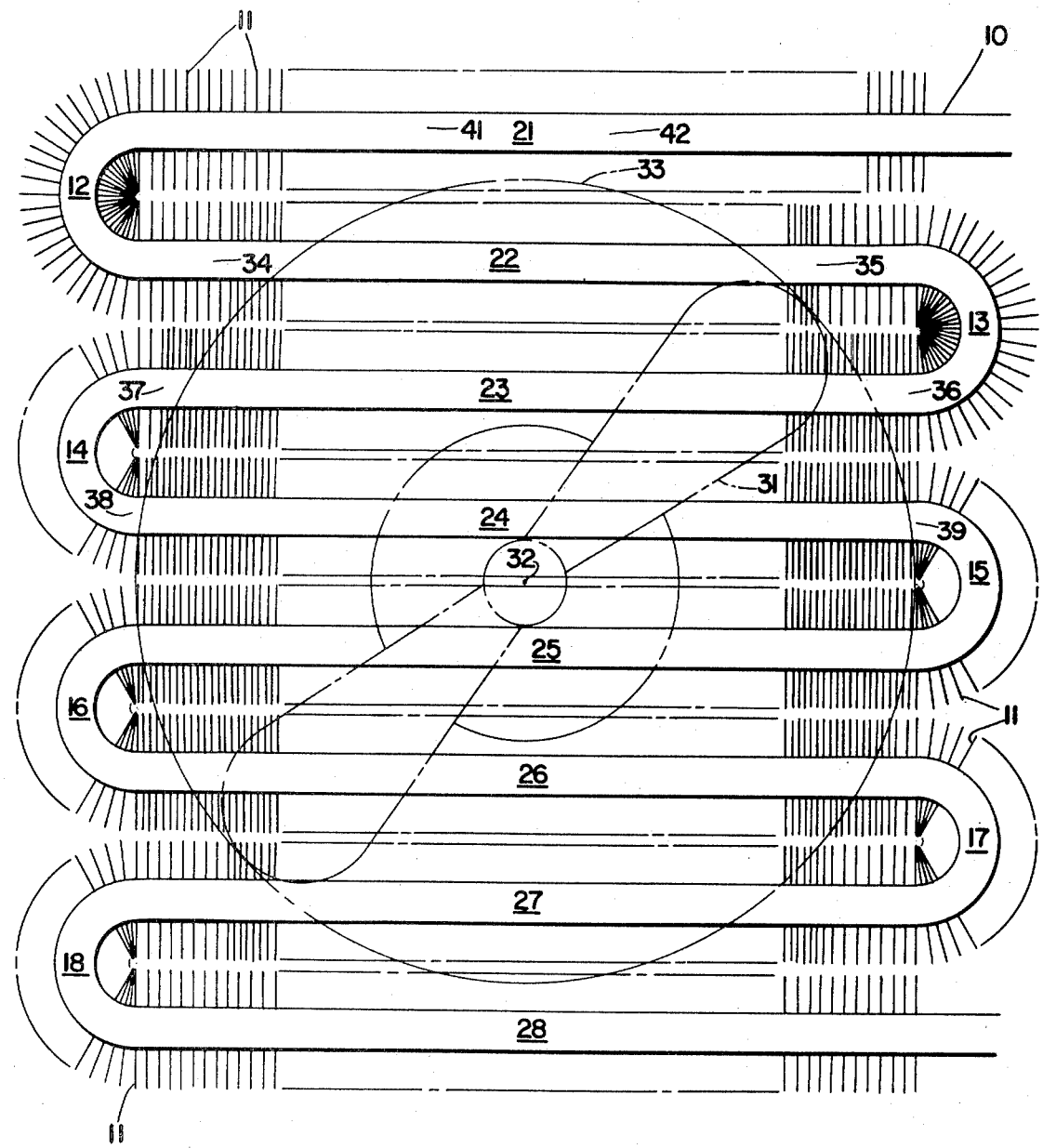
FIG. 1 is a side elevation of a heat exchanger in accordance with the present invention, with portions of the spine fins removed for purposes of illustration and schematically illustrating a fan to blow a stream of air over the heat exchanger.

FIG. 1 illustrates an assembled heat exchanger of a type which may be used, for example, in an air conditioning unit and consists of a piece of tube 10 helically wound with spine fins 11. For purposes of illustration, such spine fins 11 are only illustrated as straight lines extending radially with respect to the tube, bit it should be understood that the spine fins extend the helical pattern completely around the tubes and that the spine fins are formed generally in the manner disclosed in my earlier patents, supra.

FIG. 1 illustrates the spine fins directly opposite each other; however, it should be understood that the strips of spine fins may or may not provide diametrically opposite fins or, for that matter, the spines may not be radial with respect to the tube 10 but, instead, may be inclined to some extent. Further, the tube may be single-wrapped with a single strip or multiple-wrapped with two or more spine fin strips. Still further, the strips may be L-shaped as illustrated in my U.S. Pat. No. 3,005,253 or may be generally U-shaped as illustrated in my U.S. Pat. No. 3,134,166.

The tube 10, with the spine fins 11 thereon, is reversely bent at seven locations, 12 through 18, to provide a plurality of parallel, substantially straight passes. In the illustrated embodiment, the heat exchanger has eight passes 21 through 28, which connect between the adjacent bends and through which a refrigerant fluid or other fluid flows back and forth when the heat exchanger is in use.

A fan 31, illustrated in phantom, is mounted adjacent to the heat exchanger and operates to blow a stream of air or the like across the fin tube passes. In the illustrated embodiment, the fan 31 is a rotary, axial flow blade-type fan which rotates about a central axis at 32 and moves air across the heat exchanger with a substantially circular pattern illustrated by the phantom line 33. With such a fan, the air velocity is greatest within the circle pattern 33, and lower air velocity is provided across the heat exchanger outside of such circle.

In order to provide a high rate of heat exchange between the air passing over the heat exchanger and the fluid flowing through the tubes 10, the spine fins are arranged along the pass 22 with a high density or a small helix angle between the points 34 and 35, and a lesser density provided by a larger helix angle along the bends 12 and 13 and along the pass 22 from the bend 12 to the point 34 and between the bend 13 and the point 35. Consequently, a high density is provided along the pass 22 in the pattern of high flow and a relatively low density of spine fins is provided along the bends and the portions of the pass which are outside of such pattern of high air flow.

In a similar manner, the pass 23 is provided with a relatively high and substantially constant density between the points 36 and 37 and a lower density beyond such points and around the adjacent bends 13 and 14. Similarly, the spine fins along the pass 24 are provided with a high density or maximum heat exchange between the points 38 and 39, and lower density around the bends 14 and 15.

In a symmetrical type of heat exchanger, as illustrated in FIG. 1, the length of the high density wrapping on the pass 25 is the same as the density along the pass 24, the length of the high density along the pass 26 is the same as along the pass 23, the length of high density along the pass 27 is the same as along the pass 22, and the length of high density along the pass 21 is the same as along the pass 28, with the high density wrapping existing on the pass 21 between the points 41 and 42.

With this heat exchanger, the entire portion of the heat exchanger within the circular pattern of highest flow produced by the fan 31 is wrapped with high density spine fins for a maximum amount of heat exchange between the air and the fluid flowing through the tubing, but the portions of the heat exchanger outside of such pattern are wrapped with lower density, resulting from the use of a higher helix angle in the wrapping process. Therefore, less material is required to produce the heat exchanger than heretofore without any appreciable loss in heat exchange capacity for a given size heat exchanger. Also, in the preferred embodiment, the tube is advanced a greater rate when larger helix angles are provided, so the time for producing the tubing for the heat exchanger is also reduced in accordance with the present method.

It should be understood further that in the bending process in which the various bends are formed in the wound tubing, the spine fins along the bend are also bent and damaged to some extent so that they cannot contribute to the heat exchange with the same efficiency as the undamaged fins along the straight portions of the tube. In the drawings, however, no attempt has been made to illustrate the manner in which the damage occurs at the bends, since the damage is random in character and cannot be effectively represented in the drawing.

Figure 2:
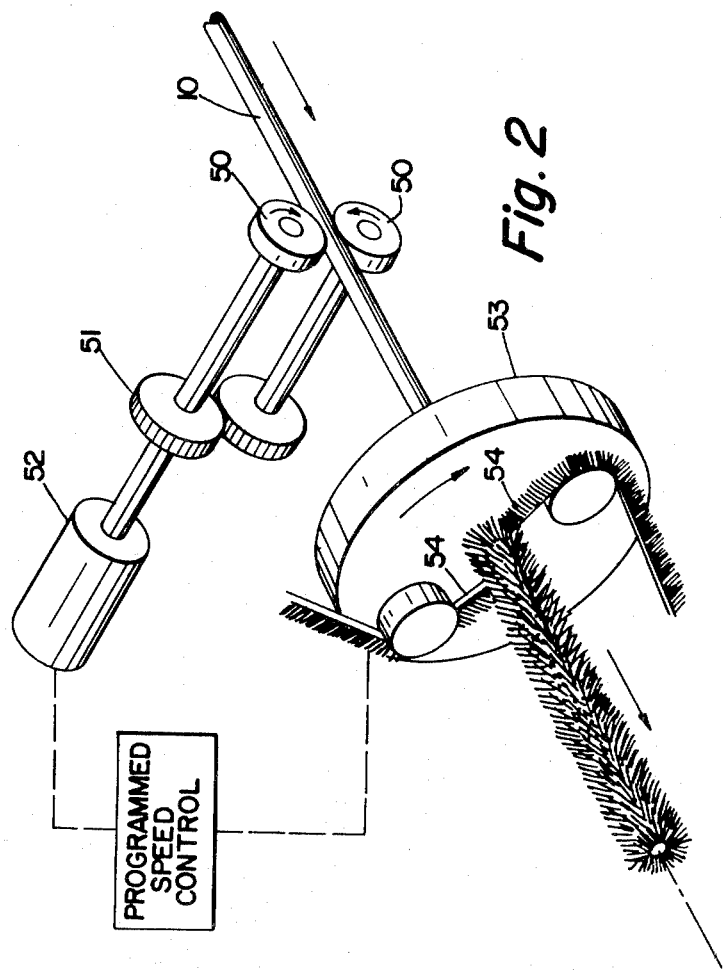
FIG. 2 is a schematic, perspective view of a machine for producing the spine fin tubing for the heat exchanger illustrated in FIG. 1.

FIG. 2 schematically illustrates a machine for producing the spine fin tubes in accordance with the present invention. Such machine provides feed rolls 50 which engage the sides of the tube 10, are connected by gearing 51, and are powered to feed the tube 10 in the direction of the arrow by a suitable drive motor 52. A wrapping head 53 rotates in the direction of the arrow 54 around the tube and wraps the tube 10 with spine fins as the tube feeds axially through the head. Reference may be made to my earlier patents, supra, for details of a wrapping head of the type illustrated at 53. Such wrapping head is supplied with strips of material 54 for the spine fins, which is cut and shaped with suitable rotary cutters and forming rollers and is then wrapped on the tube 10 under tension.

The spacing between adjacent fins is determined by the helix angle of winding, which is determined by the relationship between the speed of rotation of the head 53 and the axial speed at which the tube 10 is fed through the head. When the speed of the feed of the tube 10 is increased, thre is a greater helix angle and a greater spacing between adjacent fins, resulting in a lower density of wrapping. When the speed of the feed is reduced while the speed of the head 53 remains constant, a smaller helix angle is provided and a higher density wrap is achieved. In the illustrated machine, a programmed speed control 56 is connected to control the operating speed of the motor 52 and, in turn, controls the rate of feeding of the tube. Such speed control 56 is also connected to the head 53 through a suitable electrical connection, schematically illustrated at 57, so that it can respond to a given number of revolutions of the head to change the speed of the motor 52 and feed to provide the desired pattern of wrapping. The speed control is programmed to produce a slow feed of the tube 10 for the appropriate periods to produce each of the spaced zones of high density wrapping and to produce higher feed speeds for appropriate periods to produce the intermediate zones of low density wrapping required to produce the finished heat exchanger.

Then after the tubing is wound, it is bent along the intermediate zones of relatively low density wrapping to provide the heat exchanger illustrated and described in connection with FIG. 1. In such heat exchanger, the lengths of the zones of high density are not uniform, nor are the lengths of the zones of low density, since each pass is arranged to provide high density only within the circular pattern 33. Therefore, the control 56 is programmed to produce the various zone lengths required.

It is preferable that the rate of feed of the strip material to the tube and the rotational speed of the winding head be maintained substantially constant during the entire winding operation so that the same amount of strip material is used to form each turn or wrap along the entire length of the tube. Such strip material is stretched a greater amount when winding the intermediate zones of low density than the stretch along the high density zones to accommodate the greater helix angle. The stretching or elongation of the strip, however, must be within the limits to which it can stretch without rupture or breaking. In practice, the stretch along the zones of low density is maintained at about one percent and along the zones of low density the stretch is maintained at about three percent. With such difference in stretch or elongation of the strips, substantial increases in the helix angle or spacing can be achieved without causing breakage of the typical aluminum spine fin material used to form the fins in the instant type of heat exchanger.

Although the preferred embodiment of this invention has been shown and described, it should be understood that various modifications and rearrangements of the parts may be resorted to without departing from the scope of the invention as disclosed and claimed herein.

What is claimed is:

1. A method of producing helically wound spine fin heat exchangers having a tube wound with spine fin material providing a plurality of separate spines extending from a continuous base portion while reducing the amount of material required to produce such heat exchangers, comprising helically wrapping a substantially straight tube with spine fins having a first helix angle and a first spine fin density along a plurality of spaced first portions and with a second helix angle greater than said first helix angle and a lower spine fin density along intermediate second portions between said first portions, the density of said first portions being selected to provide substantial heat exchange capacity along the parts of said heat exchanger occupied by said first portions, and thereafter bending said tube along said second portions to provide a plurality of substantially straight passes formed at least in part by said first portions, wherein said spine fins are formed of a strip of material which is stretched as it is wound onto said tube, said base portion being stretched a greater amount along said second portions than along said first portions.

2. A method of producing helically wound spine fin heat exchangers having a tube wound with spine fin material providing a plurality of separate spines extending from a continuous base portion while reducing the amount of material required to produce such heat exchangers, comprising helically wrapping a substantially straight tube with spine fins having a first helix angle and a first spine fin density along a plurality of spaced first portions and with a second helix angle greater than said first helix angle and a lower spine fin density along intermediate second portions between said first portions, the density of said first portions being selected to provide substantial heat exchange capacity along the parts of said heat exchanger occupied by said first portions, and thereafter bending said tube along said second portions to provide a plurality of substantially straight passes formed at least in part by said first portions, wherein substantially the same length of strip is used for each wrap along both of said portions.

3. A method of producing helically wound spine fin heat exchangers having a tube wound with spine fin material providing a plurality of separate spines extending from a continuous base portion while reducing the amount of material required to produce such heat exchangers, comprising helically wrapping a substantially straight tube with spine fins having a first helix angle and a first spine fin density along a plurality of spaced first portions and with a second helix angle greater than said first helix angle and a lower spine fin density along intermediate second portions between said first portions, the density of said first portions being selected to provide substantial heat exchange capacity along the parts of said heat exchanger occupied by said first portions, and thereafter bending said tube along said second portions to provide a plurality of substantially straight passes formed at least in part by said first portions, wherein said rate of feeding of said spine fin material is controlled so that the same amount of spine fin material is applied to said tube in each turn thereof along both of said portions.

4. A method of producing helically wound spine fin heat exchanger tubes having separate and distinct spines extending from a continuous base portion comprising axially feeding a tube past a wrapping head, producing relative rotation between said tube and said wrapping head to helically wind a strip of spine fin material around said tube as it passes said winding head, changing the rate of axial feed without changing the rate of relative rotation to produce tube portions of high fin density and tube portions of lower fin density, and controlling the rate of feed of said spine fin material from said wrapping head to stretch said base portion of said spine fin material adjacent to said tube as it is wrapped around said tube and so that the amount of stretch in the said base portion of said spine fin material is greater along the portions of low fin density.

5. A method as set forth in claim 4, wherein said wrapping head is controlled to feed said spine fin material at a rate causing the same amount of spine fin material to be provided in each wrap on said tube in both said portions of high fin density and said portions of said low fin density.

6. A method as set forth in claim 4, wherein bends are thereafter formed in said portions of said low density by applying forces to said tube through the spines along said portions of said low fin density.

* * * * *